March 18, 1924.  1,486,877
G. W. GANG
CLAY PIPE HANDLING DEVICE
Filed July 25, 1921   3 Sheets-Sheet 1
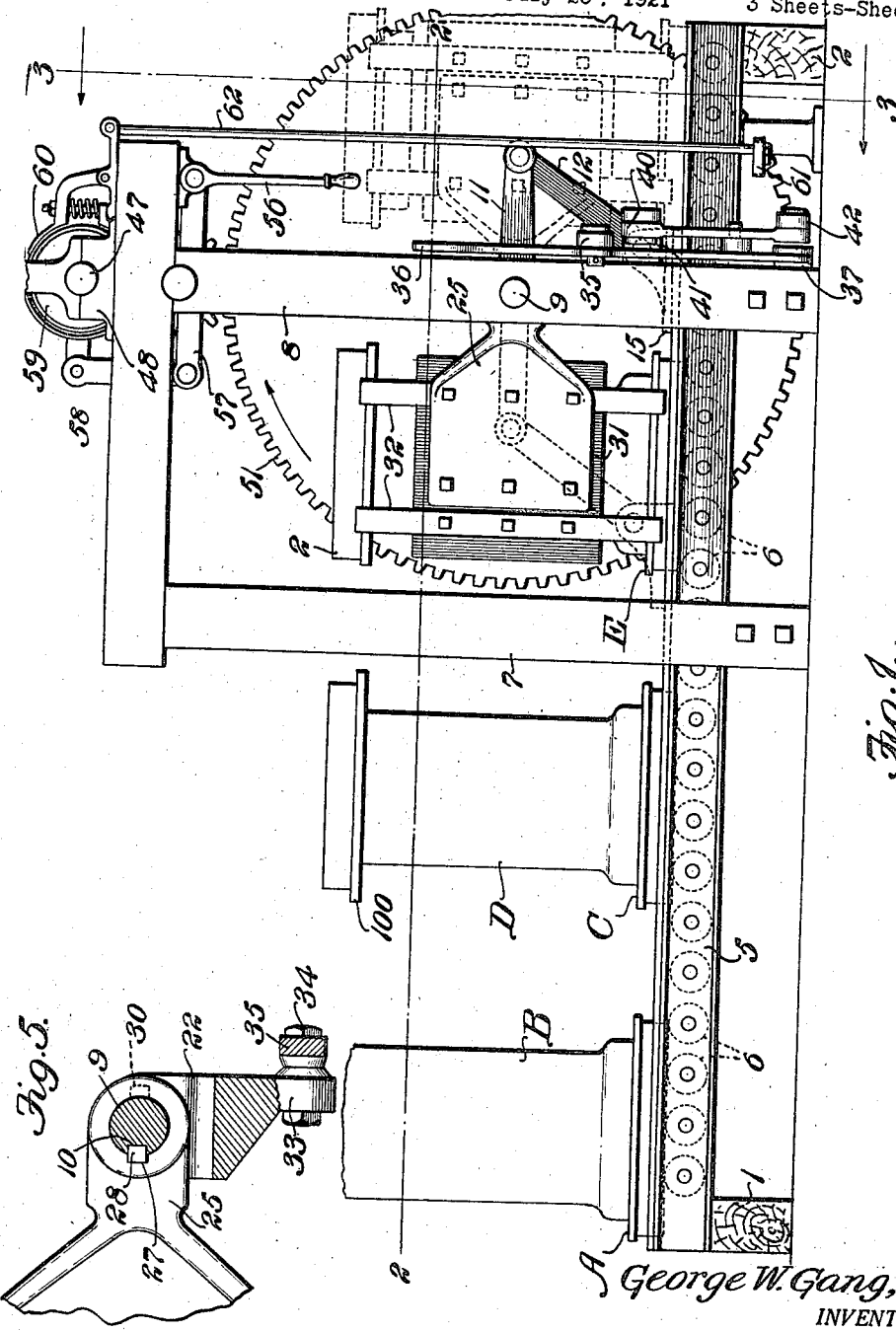
George W. Gang,
INVENTOR.
BY J. A. Bishop
ATTORNEY

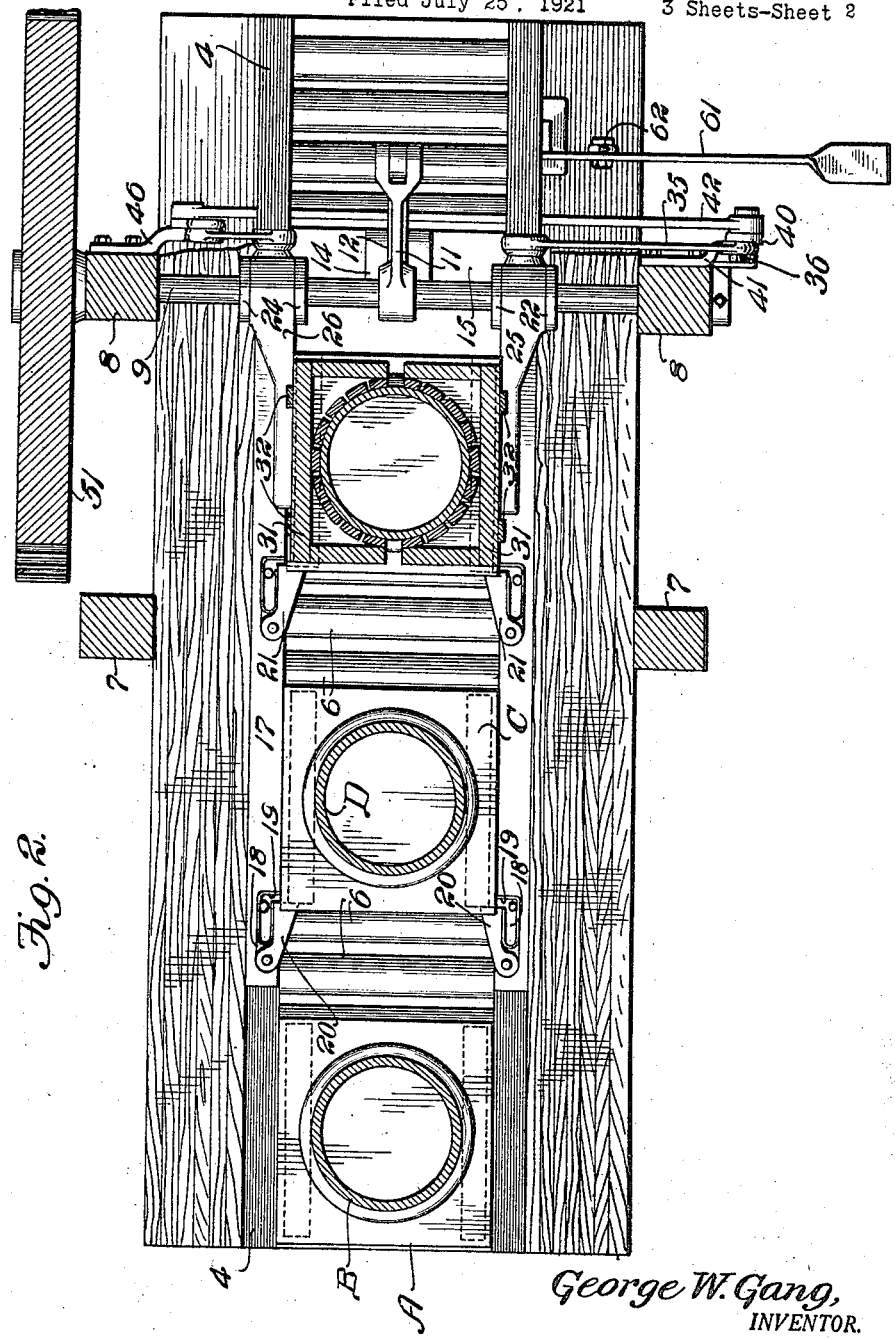

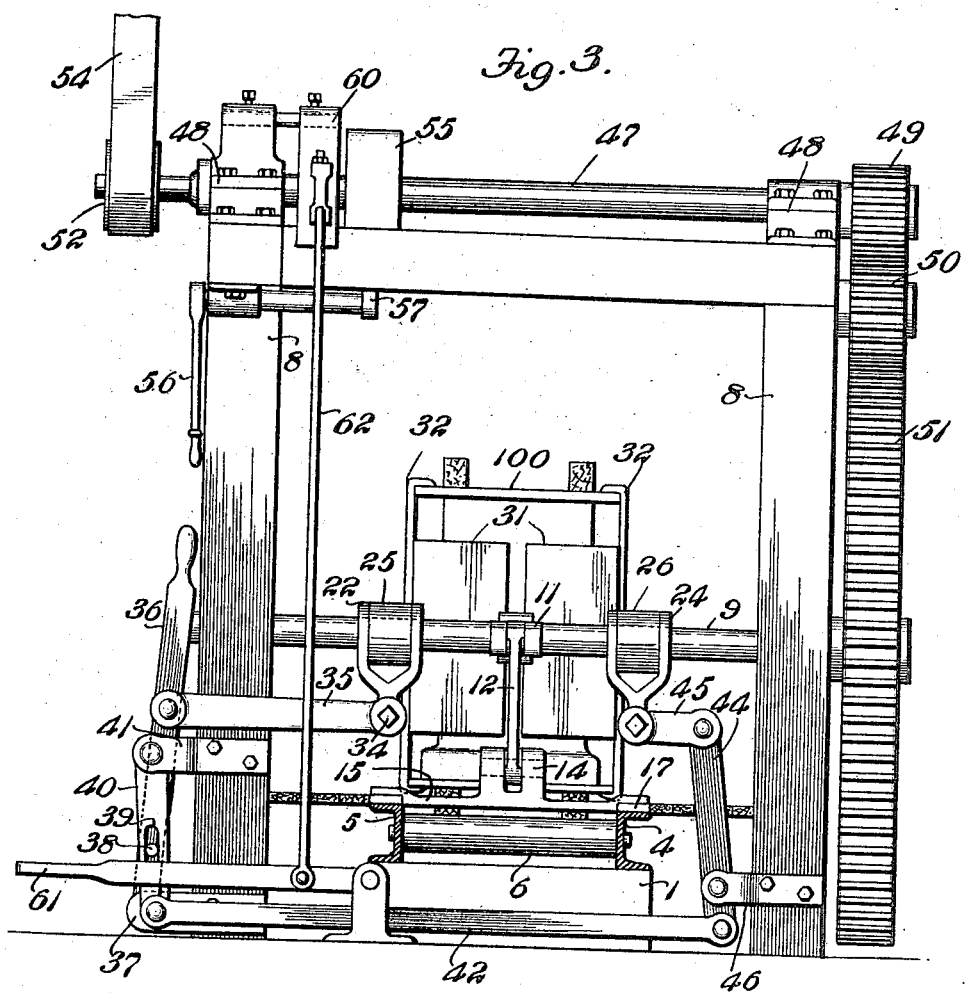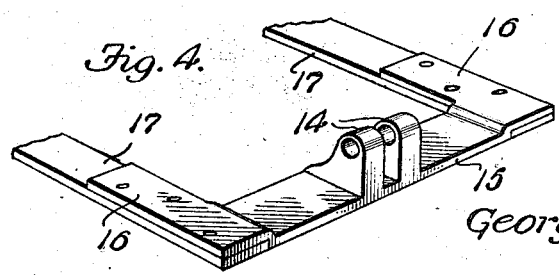

Patented Mar. 18, 1924.

1,486,877

UNITED STATES PATENT OFFICE.

GEORGE W. GANG, OF MALVERN, OHIO.

CLAY-PIPE-HANDLING DEVICE.

Application filed July 25, 1921. Serial No. 487,496.

*To all whom it may concern:*

Be it known that I, GEORGE W. GANG, a citizen of the United States, residing at Malvern, in the county of Carroll and State of Ohio, have invented a new and useful Clay-Pipe-Handling Device, of which the following is a specification.

This invention relates to clay pipe handling devices and particularly to a machine of this class designed to receive the newly made pipe from the former, turn it and convey it to a point convenient for removal to the drying room.

The principal object of the invention is to provide means for turning the lower or flanged end of the pipe as it comes from the former, uppermost into position for drying.

Another object is to provide means for removing the socket board upon which the pipe has been deposited by the former, from beneath the said former.

A further object is to provide a device capable of handling several sections of pipe at the same time, thereby increasing the speed of manufacture and effecting a large saving of time.

A still further object is the reduction of a large percentage of the manual labor now employed in this operation of pipe manufacture.

With these and other objects in view, the invention consists of the novel construction and arrangement of parts hereinafter described, illustrated in the accompanying drawings and particularly pointed out in the claims, it being understood that various changes in the form, proportions, size and minor details of construction may be made within the scope of the appended claims, without departing from the spirit, or sacrificing any of the advantages of the invention.

In the drawings, in which similar numerals of reference indicate corresponding parts, Fig. 1, is a side elevation of my machine, the turning mechanism being shown in full lines in the position preparatory to turning the pipe and in dotted lines in the position assumed at the instant the turning is completed.

Fig. 2, is a sectional plan view taken on the line 2—2 of Fig. 1.

Fig. 3, is a transverse section taken on the line 3—3 of Fig. 1 and looking in the direction of the arrows.

Fig. 4, is a detail perspective of a portion of the feed arms and yoke attached thereto, and, Fig. 5, is a fragmentary detail on an enlarged scale of the end of a bearing for one of the cradle arms and the bifurcated yoke for shifting the said arms.

In the manufacture of terra cotta pipe, the newly made sections coming from the former are deposited with the flanged end down on a pallet or board, commonly called a socket board. The uppermost or straight end of the section is rough and uneven as it comes from the former and it is therefore necessary to trim this end to make the section the proper length and to produce a clean, square finish for the said end, by employing a cut off mechanism. When the upper end of the pipe has been properly trimmed, the socket board is then lifted at one side and the section of pipe is tilted over onto a cradle which is mounted on trunnions located at its longitudinal center. The cradle is then swung to bring the pipe section into horizontal position and by continuing the swing in the same direction, the flanged or lower end of the pipe as it came from the former, is brought uppermost and the straight end is turned down and a pallet, somewhat similar to the socket board, is placed at the lower end and the pipe section tilted off the cradle and left standing on the pallet, flanged end up. The section is now ready for removal to the drying room.

When the facts are taken into consideration that the section of pipe is green or soft during the turning operation and that on large sections, such as are employed in building sewers, each section weighs approximately five hundred pounds, it may be readily understood that considerable care must be exercised in this process. When it is further understood that the placing of the section on the cradle and the upsetting thereof is all done manually, the amount of man power employed will be apparent.

In the present invention, both the number of workmen necessary and the length of time required to turn the pipe, are materially reduced.

At 1 and 2 I have shown lateral supporting members upon which are secured longitudinal spaced channel bars 4 and 5. A plurality of lateral rollers 6 are journaled to rotate between the channel bars. At 7 is a pair of spaced upright members which are arranged to straddle the channel bars and spaced from the said uprights 7 is a similar pair of uprights shown at 8. A laterally disposed shaft 9, is journaled to rotate in the uprights 8. A key-way 10 is formed in the shaft 9 for its entire length, the said keyway being for a purpose to be hereinafter set out.

At the longitudinal center of the shaft 9 is keyed an arm 11, which arm normally extends horizontally and to the rear of the said shaft. The said arm is bifurcated at its rear end and between the said bifurcations is pivotally secured the upper end of a link 12, the said link extending downwardly and forwardly and being connected at its lower end to a bearing 14 formed on the upper side of a yoke 15. The arms 16 of the yoke extend forwardly and are secured by bolts or other suitable means to the rear extremities of flat bars 17 which lie, and are adapted to slide upon the upper faces of the channel bars 4 and 5. Adjacent the forward extremities of the bars 17 and upon the upper faces thereof, are formed recesses 18 into which are fitted leaf springs 19 which are arranged to exert a pressure against pivoted pawls 20 so that the said pawls will normally lie with their free ends projecting beyond the inner sides of the bars to which they are respectively attached. Equidistantly spaced from the forward end of each of the bars 17 is a second pawl or catch 21, similar in every respect to the first described pawls and being similarly spring pressed to project beyond the inner lines of the bars 17.

Rotatably mounted on the shaft 9 and equidistantly spaced from the arm 11 is a pair of downwardly projecting yoke members 22 and 24 and between the arms of the yoke members and carried by the shaft 9, are arms 25 and 26, respectively. Keyways 27 are formed in the said arms and keys 28 are seated in the said keyways and in the keyway 10 formed in the shaft 9, thus locking the said arms to the shaft. A keyway 30 is also formed in each of the yokes 22 and 24 and is designed to permit the keys 28 to be inserted. This is accomplished by swinging the said yokes into a position diametrically opposite to that shown in Fig. 5, in which position the keyways 10, 27 and 30 will all register one with the other. The keys 28 may then be inserted and the yokes 22 and 24 swung down into the position shown in Fig. 5, thus locking the keys within the keyways 27.

The arms 25 and 26 will preferably be in the form of heavy drop forgings since each of them will be required to withstand a lifting strain of several hundred pounds. The said arms extend forward from the shaft 9 and are widened as shown in Fig. 1, and to the inner side of each arm is securely fastened one member 31 of the cradle. The members 31 are each formed with a vertical concave recess, which recesses, when brought together as shown in Fig. 2, form a substantially cylindrical space centrally thru the cradle. A pair of bars 32 is secured to the outer face of each cradle member, the said bars being bent inwardly at their extremities to form hooks as clearly shown in Fig. 3.

At the lower end of the yoke member 22 is formed an eye 33 to which is pivotally attached by means of a bolt 34, one end of a link 35. The link 35 extends outwardly and beyond the outer side of the adjacent standard 8 and is pivotally attached at its outer end to a lever 36, which lever is pivoted at its lower extremity to a bracket 37 secured to the standard. By this arrangement it will be seen that when the upper end of the lever 36 is pulled outwardly and away from the standard, the link 35 will draw the yoke 22 outwardly also sliding the arm 25 along the shaft 9 and carrying with it the member 31 of the cradle attached to the said arm.

A stud or pin 38 is secured to the rear side of the lever 36 and is arranged to project into a slot 39 formed in a link 40 which is pivoted at its upper extremity to a bracket 41 secured to the standard. The lower extremity of the link 40 is attached to one end of a laterally extending rod 42, to the opposite end of which is attached a link 44 which extends upwardly and is pivotally secured at its upper to another link 45 which is attached to the yoke 24. The link 44 is pivoted intermediate its ends to a bracket 46 secured to the adjacent standard 8. It will thus be seen that when the lever 36 is pulled outwardly as above described, the pin 38 operating within the slot 39, will cause the link 40 to exert a pull upon the rod 42, which will in turn rock the link 44 and slide the yoke 24 outwardly. The arm 26 carrying its attached member 31 of the cradle will likewise be slid outwardly on the shaft 9. By reference to Fig. 3, it will be seen that by the arrangement of links and levers just described, the yokes 22 and 24 will each be moved an equal distance from the lateral center of the shaft 9 when the lever 36 is pulled outwardly.

Referring now more especially to Figs. 1 and 3, a shaft 47 is journaled in bearings 48 carried by a frame supported on the standards 7 and 8. A relatively small pinion 49 is carried on one extremity of the shaft 47 and is arranged to mesh with an idler pinion 50 mounted on one of the standards 8, which idler in turn meshes with a relatively larger gear 51 keyed to the shaft 9. A pulley 52 is mounted on the end of the shaft 47 opposite the pinion 49 and is driven by a belt 54 from any suitable source of power, not shown, such as an electric motor.

It will thus be seen that when the shaft 47 is rotated, the pinion 49, driving thru the idler 50, will cause the large gear 50 to rotate and revolve with it the shaft 9, which being keyed to the arms 25 and 26 carrying the cradle members 31, will also cause the said cradle members to rotate. When the arms 25 and 26 and the cradle have been swung from the full line position to the dotted line position shown in Fig. 1, it is necessary to reverse the direction of rotation of the gear 51 in order to return the cradle to its first position. This is accomplished by means of a gear reversing clutch shown at 55, which clutch is located on the shaft 47. The shaft 47 will of course be divided at the said clutch, the end carrying the driving pulley 52 being connected to the driving gear within the clutch while the end carrying the pinion 49 may rotate independently of the first mentioned end and is connected to the driven gears within the clutch. The said clutch will be of any well known construction common to gear reversing clutches for this purpose and will be operated by the lever 56 working thru the links 57 and 58.

Fastened to the shaft 47 will also be a brake drum 59 upon which will operate a brake band 60, controlled by a foot lever or pedal 61, which is connected to the brake band by a rod 62. The object of the said brake is to retard the movement of the cradle during the revolving thereof, when the said cradle has passed dead center and starts downward. This is especially necessary when the cradle is carrying a section of pipe because of the great weight of the load.

The operation of my machine will be as follows; one of the socket boards, such as A, will be placed as shown in Figs. 1 and 2 of the drawings. In this position the socket board A is in direct vertical alinement beneath the discharge from the former, not shown, the under portion of the said board resting on the rollers 6. The pipe section, such as B, coming from the former will be deposited on the socket board in the position shown in Fig. 1. The lever 56 is now moved to throw the mechanism of the clutch 55 into neutral position, disengaging the driven gears connected to the driven section of the shaft 47. The power is then applied to the pulley 52, starting the driven end of the shaft to rotate. The lever 56 is now moved to throw the mechanism of the clutch into proper position to drive the gear 51 in the direction indicated by the arrow in Fig. 1. This will, of course, rotate the shaft 9 in the same direction and cause the arm 11 keyed to the said shaft to move downwardly, the link 12 forcing the yoke 15 and sliding rods 17 forwardly on the top faces of the channel bars 4 and 5. The pawls 20 will be forced inwardly as they pass the socket board A, but will spring back into extended position on reaching the forward end of the said socket board, this being the limit of the forward movement of the rods 17. The lever 56 is now moved to reverse the direction of rotation of the shaft 9 and the arm 11 will consequently draw the yoke 15 and sliding rods 17 rearwardly, bringing with them the socket board A bearing the pipe section B. When the arm 11 has returned to its starting position, the board A will be occupying the position shown at C in Figs. 1 and 2 and the lever 56 is once more moved into neutral thus stopping further rotation of the shaft 9. The pipe section B is now positioned as indicated at D, in which position the trimming mechanism, (not shown) is employed to trim the upper end of the said section and a floor board, substantially similar to the socket board, is positioned as shown at 100 on the upper end of the pipe.

Another socket board is now placed beneath the former and the lever 56 again operated to slide the rods 17 forward. The pawls 20 will engage the foremost socket board while the pawls 21 will have advanced to a point to similarly engage the second board. It will of course be understood that the arms 25 and 26 carrying the cradle members will be moved into the dotted line position shown in Fig. 1, each time the shaft 9 is rotated to move the rods 17 forward. Having now reached this position, when the rods 17 are at the limit of their forward movement on the second stroke, the lever 36 will be pulled outwardly, moving the cradle members apart. When the lever 56 is again moved to reverse the shaft 9, the socket board at C will be moved to the position shown at E and one of the members 31 of the cradle will descend on either side of the pipe section carried by the said board. The lever 36 is now moved inwardly, bringing the cradle members against the pipe section. The in-turned hooks on the bars 32 on the cradle members will engage the under side of the socket board and the upper side of the floor board, respectively, as clearly shown in Fig. 3. The shaft 9 is once more rotated and the section of pipe within the cradle is now lifted and carried over the said shaft to the dotted line position of Fig. 1. The lever 36 is once more operated to separate the cradle members and the pipe section is left standing in this position upon its floor board. If desirable, a truck or other suitable conveyance may be placed in position to receive the pipe from the cradle, for easy removal to the drying room.

It will, of course, be understood that each time the socket board carrying the new made section of pipe is moved from beneath the former, another socket board is placed in position for the next section, thus making the operation of my machine continuous.

Owing to the great weight of the cradle when it contains the section of pipe, the foot operated brake is provided as above described, to enable the operator to retard the downward movement of the cradle.

Having now described my invention, what I claim is:—

1. In a machine for turning pipe sections, a rotatable shaft, a pair of cradle members keyed to said shaft and slidable thereon and means for rotating said shaft.

2. In a machine for turning pipe sections, a rotatable shaft, a pair of slidable arms keyed to said shaft, a cradle member carried by each of said arms, means for sliding said arms toward each other to enclose a pipe section with said cradle members and means for sliding said arms apart to release said pipe section from said cradle members.

3. A device of the character described comprising a rotatable shaft, a pair of arms slidably keyed to said shaft, a cradle member carried by each of said arms and movable therewith, a pair of yokes slidably and rotatably mounted on said shaft, each of said arms being positioned between the bifurcations on one of said yokes and means for sliding said yokes toward and away from each other on said shaft.

4. A device of the character described comprising a rotatable shaft, pipe enclosing cradle members carried by said shaft and rotatable therewith, an arm carried by said shaft, conveyor means connected to said arm and arranged to move pipe sections into position to be enclosed by said cradle members.

5. In a device of the character described a rotatable shaft, a pair of yokes slidably mounted on said shaft and rotatable thereon, an arm positioned between the bifurcations of each of said yokes and rotatable with said shaft, a cradle member carried by each of said arms, a pivoted lever and a plurality of links connecting said lever with said yokes and arranged to bring the cradle members together when the said lever is moved in one direction and to slide said cradle members apart when the said lever is moved in the opposite direction.

6. In a device of the character described, a shaft rotatable in either direction, a cradle carried by said shaft and arranged to rotate therewith, an arm secured to said shaft and connected to a reciprocating conveyor, pawls carried by said conveyor and arranged to recede as said conveyor moves forwardly and to engage pallets bearing pipe sections as said conveyor moves backwardly, conveying said pipe sections by said engagement.

In testimony that I claim the above, I have hereunto subscribed my name.

GEORGE W. GANG.